(12) United States Patent
Sofos et al.

(10) Patent No.: US 9,922,362 B2
(45) Date of Patent: *Mar. 20, 2018

(54) CONTENT RECOMMENDATIONS BASED ON PERSONAL PREFERENCES

(71) Applicant: AT&T Intellectual Property I, L.P., Atlanta, GA (US)

(72) Inventors: James T. Sofos, Aurora, IL (US); Lee M. Chow, Naperville, IL (US); David J. Piepenbrink, Chicago, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,539

(22) Filed: Oct. 5, 2015

(65) Prior Publication Data

US 2016/0027090 A1 Jan. 28, 2016

Related U.S. Application Data

(63) Continuation of application No. 12/415,771, filed on Mar. 31, 2009, now Pat. No. 9,172,482.

(51) Int. Cl.
*H04N 21/40* (2011.01)
*G06Q 30/06* (2012.01)
*H04H 60/31* (2008.01)
*H04H 60/66* (2008.01)

(52) U.S. Cl.
CPC ......... *G06Q 30/0631* (2013.01); *H04H 60/31* (2013.01); *H04H 60/66* (2013.01)

(58) Field of Classification Search
None
See application file for complete search history.

(56) References Cited

U.S. PATENT DOCUMENTS

| | | | |
|---|---|---|---|
| 5,948,061 A | 9/1999 | Merriman et al. | |
| 7,365,655 B2 | 4/2008 | Rao et al. | |
| 7,574,659 B2 | 8/2009 | Szabo | |
| 7,627,501 B2 | 12/2009 | Bagsby et al. | |
| 7,631,325 B2 | 12/2009 | Rys et al. | |
| 7,657,907 B2 | 2/2010 | Fennan et al. | |
| 7,818,419 B1 | 10/2010 | McAllister et al. | |
| 8,751,313 B2 * | 6/2014 | Fisher | G06Q 20/20 235/375 |
| 2001/0001160 A1 * | 5/2001 | Shoff | H04N 5/44543 725/51 |
| 2002/0059584 A1 | 5/2002 | Ferman et al. | |
| 2003/0004934 A1 | 1/2003 | Qian | |
| 2003/0018543 A1 * | 1/2003 | Alger | G06Q 30/06 705/26.1 |
| 2003/0146940 A1 * | 8/2003 | Ellis | H04H 60/31 715/811 |
| 2003/0206710 A1 | 11/2003 | Ferman et al. | |
| 2003/0233655 A1 | 12/2003 | Gutta et al. | |

(Continued)

*Primary Examiner* — Cai Chen
(74) *Attorney, Agent, or Firm* — Scott P. Zimmerman, PLLC

(57) ABSTRACT

Electronic multimedia content is recommended based on personal preferences. Consumption information may be collected to generate recommended multimedia content. Electronic storefronts may also be selected based on the consumption information. Different portals and access points may be used based on IPTV assets, mobile assets, and mobile assets.

20 Claims, 10 Drawing Sheets

(56) References Cited

U.S. PATENT DOCUMENTS

| | | |
|---|---|---|
| 2004/0073918 A1 | 4/2004 | Ferman et al. |
| 2004/0117816 A1 | 6/2004 | Karaoguz et al. |
| 2005/0141864 A1 | 6/2005 | Sezan et al. |
| 2006/0010470 A1 | 1/2006 | Kurosaki et al. |
| 2007/0097860 A1 | 5/2007 | Rys et al. |
| 2007/0101351 A1 | 5/2007 | Bagsby et al. |
| 2007/0136753 A1* | 6/2007 | Bovenschulte ........ H04H 60/31 725/46 |
| 2007/0244750 A1 | 10/2007 | Grannan et al. |
| 2007/0300280 A1 | 12/2007 | Turner et al. |
| 2008/0074424 A1 | 3/2008 | Carignano |
| 2008/0086741 A1 | 4/2008 | Feldman et al. |
| 2008/0168487 A1 | 7/2008 | Chow et al. |
| 2008/0235101 A1 | 9/2008 | Piepenbrink et al. |
| 2008/0235104 A1 | 9/2008 | Chow et al. |
| 2008/0235278 A1 | 9/2008 | Piepenbrink et al. |
| 2009/0049469 A1 | 2/2009 | Small et al. |
| 2009/0119696 A1 | 5/2009 | Chow et al. |
| 2009/0119703 A1 | 5/2009 | Piepenbrink et al. |
| 2009/0132383 A1 | 5/2009 | Piepenbrink et al. |
| 2009/0164316 A1 | 6/2009 | Piepenbrink et al. |
| 2009/0172765 A1* | 7/2009 | Kim ....................... G06Q 30/02 725/131 |
| 2009/0222335 A1 | 9/2009 | Gopal et al. |
| 2010/0115627 A1 | 5/2010 | Chow et al. |
| 2010/0122280 A1 | 5/2010 | Sofos et al. |
| 2010/0124399 A1 | 5/2010 | Sofos et al. |
| 2010/0125866 A1 | 5/2010 | Sofos et al. |
| 2010/0125867 A1 | 5/2010 | Sofos et al. |
| 2010/0138855 A1 | 6/2010 | Sofos et al. |
| 2010/0146607 A1 | 6/2010 | Piepenbrink et al. |
| 2010/0150521 A1 | 6/2010 | Chow et al. |
| 2010/0162319 A1 | 6/2010 | Piepenbrink et al. |
| 2010/0162342 A1 | 6/2010 | Piepenbrink et al. |
| 2010/0162363 A1 | 6/2010 | Piepenbrink et al. |
| 2010/0205634 A1 | 8/2010 | Knudson et al. |
| 2011/0022689 A1 | 1/2011 | Piepenbrink et al. |
| 2011/0041147 A1 | 2/2011 | Piepenbrink et al. |
| 2011/0041148 A1 | 2/2011 | Piepenbrink et al. |
| 2011/0041149 A1 | 2/2011 | Piepenbrink et al. |
| 2011/0055866 A1 | 2/2011 | Piepenbrink et al. |
| 2011/0066652 A1 | 3/2011 | Piepenbrink et al. |
| 2011/0066674 A1 | 3/2011 | Piepenbrink et al. |
| 2011/0067049 A1 | 3/2011 | Piepenbrink et al. |
| 2011/0112930 A1 | 5/2011 | Piepenbrink et al. |

* cited by examiner

CONTENT RECOMMENDATIONS BASED ON PERSONAL PREFERENCES

CROSS-REFERENCE TO RELATED APPLICATION

This application is a continuation of U.S. application Ser. No. 12/415,771 filed Mar. 31, 2009, since issued as U.S. Pat. No. 9,172,482, and incorporated herein by reference in its entirety.

BACKGROUND

Field of the Disclosure

The present disclosure relates to presenting assets related to multimedia content and, more particularly, to providing recommendations for multimedia content.

Description of the Related Art

Modern multimedia content distribution networks provide a vast array of multimedia content assets to customers. Customers may be unaware of certain multimedia content available for purchase, or may have difficulty selecting multimedia content, such as video-on-demand, from a myriad of choices.

DESCRIPTION OF EXEMPLARY EMBODIMENTS

Figure 1:
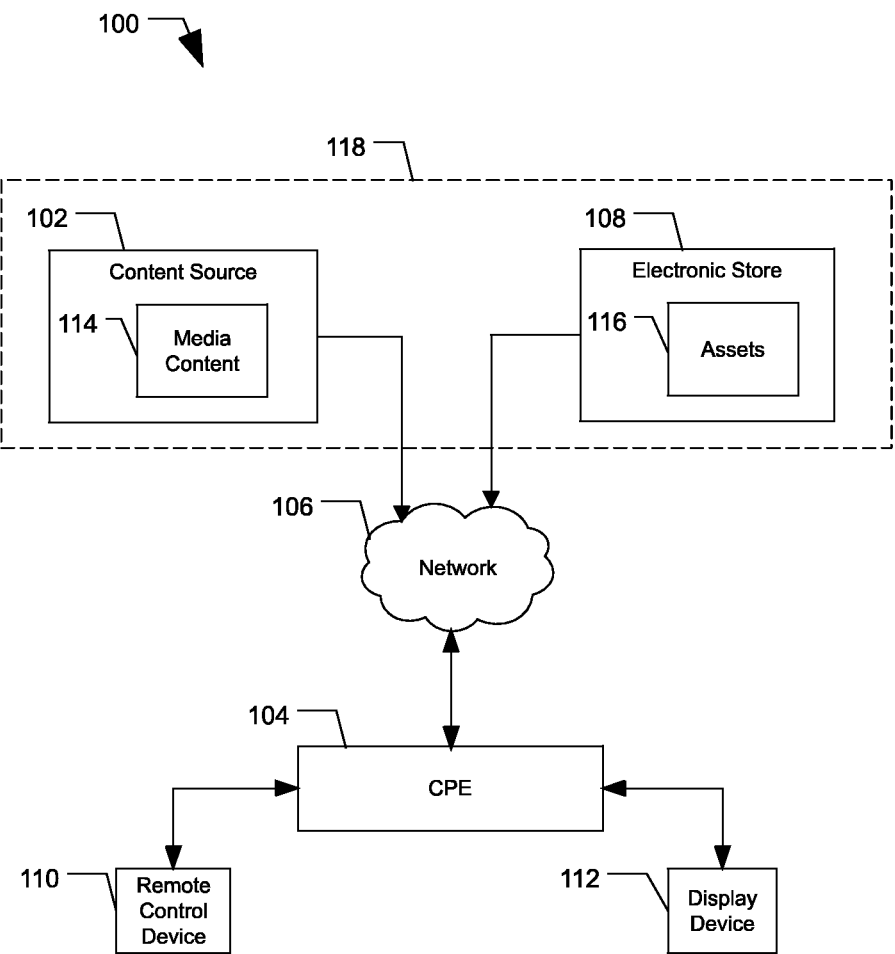
FIG. 1 is a block diagram of selected elements of an embodiment of a multimedia content distribution network.

In one aspect, a disclosed method for recommending multimedia content in a unified storefront (USF) application of a multimedia content distribution network (MCDN) may include retrieving consumption information collected for a plurality of users, wherein the consumption information is associated with multimedia content provided over the MCDN, and using the consumption information to generate a collection of recommended multimedia content, including at least one obtainable multimedia asset. The method may further include offering the collection of recommended multimedia content to a user having a registered account for the MCDN, and making the offered collection accessible to the user via at least one of: a web portal, an Internet-protocol television (IPTV) portal provided by the MCDN, and a mobile portal.

The consumption information may include rankings based on most purchased multimedia assets, most viewed multimedia assets, rated multimedia assets, or a combination thereof. The rated multimedia assets may be ranked based on ratings provided by at least some of the plurality of users. The rankings may be determined from consumption information collected over a predefined time span.

The user may provide user input for purchasing a selected multimedia asset. The user may then be provided access to the multimedia asset via at least one of: a web portal, an IPTV portal provided by the MCDN, and a mobile portal.

In yet another aspect, a disclosed method for recommending multimedia content in a MCDN may include retrieving consumption information describing multimedia content provided by the MCDN that is associated with a user, and obtaining contextual information describing a real-time interaction by the user with the MCDN. Based on the consumption information and the contextual information, the method may further include generating recommended multimedia content including at least one obtainable multimedia asset, and making the recommended multimedia collection accessible to the user via at least one of: a web portal, an IPTV portal provided by the MCDN, and a mobile portal. The user may be associated with a registered account for the MCDN.

The consumption information may include includes information about at least one of a browsing history, a viewing history, a recording history, a deletion history, and an MCDN account history. The contextual information may include information about at least one of: current browsing, current viewing, current recording, and current MCDN account activity. The consumption information and/or the contextual information may be collected over a predefined time span. A USF application may be used to make the recommended multimedia content accessible.

Responsive to receiving user input to the USF application, the method may further include selecting for a purchase request a multimedia asset from the recommended multimedia content, and submitting the purchase request, wherein the purchase request includes billing information. The billing information may specify an MCDN account associated with the user. In response to receiving approval for the purchase request, the method may further include providing the user with access to the selected multimedia asset via at least one of: a web portal, an IPTV portal provided by the MCDN, and a mobile portal.

In some embodiments, an MCDN server may aggregate consumption information and contextual information for a plurality of user premises equipment (CPE) clients, while maintaining a personalized profile for users of the plurality of CPE clients.

In a further aspect, a disclosed CPE for use within a client configuration of an MCDN includes a processor, a network adapter configured to receive multimedia content, and memory media accessible to the processor, including instructions executable by the processor. The instructions may be executable by the processor to execute a USF application, as described herein.

In yet another aspect, disclosed computer-readable memory media include executable instructions for implementing an MCDN according to the operations described herein. The instructions may be executable to implement a recommendation engine, according to the operations described herein.

In the following description, details are set forth by way of example to facilitate discussion of the disclosed subject matter. It should be apparent to a person of ordinary skill in the field, however, that the disclosed embodiments are exemplary and not exhaustive of all possible embodiments.

FIG. 1 is a block diagram of a particular illustrative embodiment of system 100 to present assets related to media content. System 100 includes content source 102 that communicates with CPE 104 (which may include, for example, a set-top box (STB) device) via network 106. Content source 102 includes a memory to store media content 114. CPE 104 can receive input from remote control device 110 and can communicate audio and video to display device 112. In a particular embodiment, network 106 may be a public network, such as the Internet, or a private access network, such as an MCDN.

Content source 102 and CPE 104 can communicate with electronic store server 108 via network 106. Electronic store server 108 includes data related to one or more assets 116, which may be related to media content 114. In an illustrative embodiment, server system 118 can include both content source 102 and electronic store server 108, providing a single interface for media content distribution and for presenting assets related to the media content.

In one embodiment, server system 118 receives a request for an electronic storefront from a destination device, such as CPE 104. Server system 118 can identify media content received at CPE 104 based on the request or based on data from content source 102. Server system 118 (or electronic store server 108) can generate an electronic storefront that includes selectable indicators related to assets selected from assets 116 based on the media content. In certain embodiments, assets 116 can include data related to physical assets and electronic assets that are related to the media content. For example, the physical assets may include articles of clothing (hats, shirts, jackets, other articles of clothing, or any combination thereof), posters (movie posters, actor photographs, other images, or any combination thereof), soundtracks (e.g., compact discs (CDs)), other physical products, or any combination thereof. The electronic assets can include digital wallpaper (movie images, actor images, other images, or any combination thereof), ring tones (audio clips from media content, soundtrack clips, other audio clips, or any combination thereof), downloadable soundtracks, Video on Demand (VOD) content, video clips, other electronic assets, or any combination thereof. In general, each of the assets may have different associated access rights. For example, a ring tone electronic asset may allow unrestricted use of the ring tone after purchase, while a movie download may allow a limited number of viewings or unlimited access for a period of time.

In a particular illustrative embodiment, server system 118 generates an electronic storefront including a graphical user interface (GUI). The GUI includes multiple selectable indicators related to assets that are associated with media content that is received at CPE 104. Server system 118 can target specific assets to CPE 104 based on media content received at CPE 104.

In some embodiments, the GUI may include information describing selected assets 116 or describing a plurality of purchase options related to the selected assets. The information may be personalized to a user or subscriber of CPE 104. In another particular embodiment, the information describing the asset or the information describing the plurality of purchase options may be personalized to an account associated with CPE 104.

In an embodiment, server system 118 may provide a plurality of purchase options, including non-exclusive offers and exclusive customized offers. The exclusive customized offers may be based on past purchase history, viewing history, geographic location, length of service with a service provider, time of day, an account status, a type of account, or any combination thereof. The non-exclusive offers or the exclusive offers may be based on a sponsorship setting of a particular television program, a sponsorship of a particular television channel, or a sponsorship of the television program service. For example, the sponsorship setting may include information about television advertisers that have certain interactive features associated with their advertising content or with other television content. In some cases, advertisers may associate with this advertising content interactive features such as: information gathering interactive features (e.g., polls); entertainment interactive features (e.g., games); informative interactive features (e.g., product information queries); product request interactive features (e.g., order forms); or any combination thereof.

In another illustrative embodiment, the information describing an asset may include information related to a promotion. For example, server system 118 may be adapted to cross-sell products for a particular promotion. The promotion may be directed to a particular movie, such as King Kong, where particular regions may be targeted for the promotion. Subscribers in San Antonio, Tex., for example, may receive discounted pricing for accessing the movie "King Kong." Such pricing promotions may be used to entice viewers to access such services.

In one embodiment, the promotion may have specific assets associated with it, such as a particular movie. The particular promotion may include multiple related assets, such as the movie and products related to the movie, such as t-shirts, baseball hats, coffee cups, shot glasses, CDs, other paraphernalia, or any combination thereof. Additionally, the promotion may include multiple related electronic assets, such as video clips, computer desktop wallpaper, a downloadable soundtrack, ring tones for a mobile phone, other electronic assets, or any combination thereof. Further, the promotion may include a discounted subscription service, such as an option to modify a subscription associated with the destination device to add a movie channel package, to subscribe to a number of VOD movies per month, another service, or any combination thereof.

More than one promotion may be associated with a particular asset. In a particular embodiment, multiple promotions from more than one asset provider may be included in assets 116, and multiple purchase options may be provided for accessing selected assets. In a particular embodiment, server system 118 may provide an interactive feature to direct a customer to an asset that is associated with a particular promotion. For example, if destination CPE 104 is associated with a subscriber in the San Antonio, Tex. area, server system 118 may provide a GUI that includes multiple promotional offers that are available to a particular subscriber. Server system 118 may provide a feature that allows CPE 104 to provide a display of a best promotional offer (e.g., lowest price, largest number of related assets, popular promotional options based on selections by other subscribers, other criteria, or any combination thereof). In one illustrative embodiment, server system 118 may recommend a particular payment option from multiple available payment options. The recommendation may be based on the subscriber account associated with CPE 104, based on an active promotion, based on payment option expiration (such as an expiration date associated with a payment coupon or credit), or any combination thereof.

In an illustrative embodiment, CPE 104 may receive data that can be executed by a processor to generate a GUI, which may be provided to display device 112. The GUI can include multiple purchasable assets of different types and multiple related purchase options. CPE 104 may receive an input related to one or more of the multiple purchasable assets and an associated purchase option via remote control device 110. CPE 104 can send a request to server system 118 that is related to the input.

Figure 2:
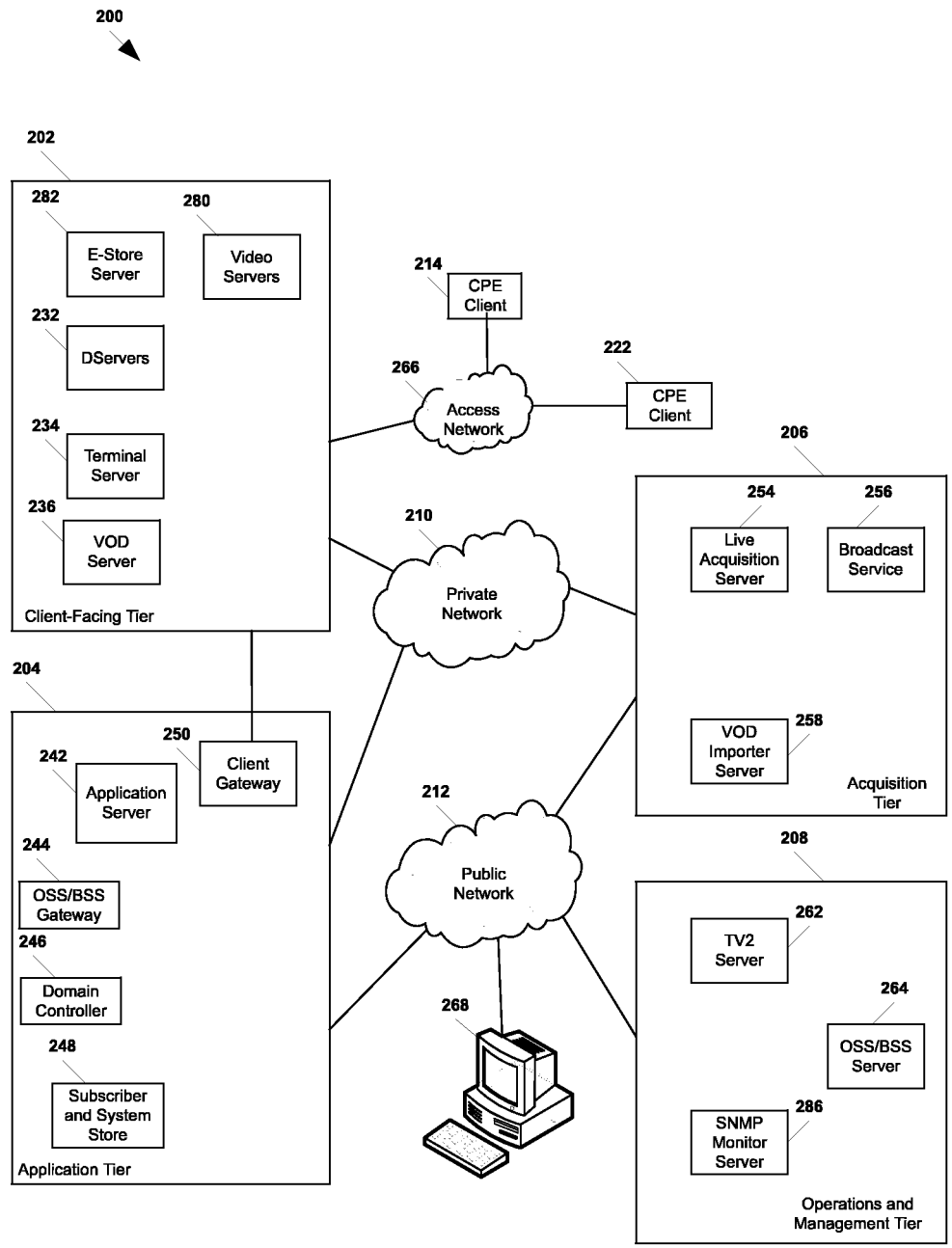
FIG. 2 is a block diagram of selected elements of an embodiment of a multimedia content distribution network.

FIG. 2 is a block diagram of an illustrative embodiment of MCDN system 200 that may be used to present assets related to multimedia content. Although multimedia content is not limited to TV, VOD, or pay-per-view (PPV) programs, the depicted embodiments of MCDN system 200 and its capabilities are primarily described herein with reference to these types of multimedia content, which are interchangeably referred to herein as "multimedia content", "multimedia content programs", "multimedia programs" or, simply, "programs."

The elements of MCDN system 200 illustrated in FIG. 2 depict network embodiments with functionality for delivering multimedia content to a set of one or more users. It is noted that different embodiments of MCDN system 200 may include additional elements or systems (not shown in FIG. 2 for clarity) as desired for additional functionality, such as data processing systems for billing, content management, customer support, operational support, or other business applications.

As shown, system 200 can include client-facing tier 202, application tier 204, acquisition tier 206, and operations and management tier 208. Each tier 202, 204, 206, 208 is coupled to private network 210; to public network 212, such as the Internet; or to both private network 210 and public network 212. For example, client-facing tier 202 can be coupled to private network 210. Further, application tier 204 can be coupled to private network 210 and to public network 212. Acquisition tier 206 can also be coupled to private network 210 and to public network 212. Additionally, operations and management tier 208 can be coupled to public network 212.

As illustrated in FIG. 2, the various tiers 202, 204, 206, 208 communicate with each other via private network 210 and public network 212. For instance, client-facing tier 202 can communicate with application tier 204 and acquisition tier 206 via private network 210. Application tier 204 can communicate with acquisition tier 206 via private network 210. Further, application tier 204 can communicate with acquisition tier 206 and operations and management tier 208 via public network 212. Moreover, acquisition tier 206 can communicate with operations and management tier 208 via public network 212. In a particular embodiment, elements of application tier 204, including, but not limited to, client gateway 250, can communicate directly with client-facing tier 202.

Client-facing tier 202 can communicate with user equipment via access network 266. In an illustrative embodiment, CPE clients 214, 222 can be coupled to a local switch, router, or other device of the access network 266. Client-facing tier 202 may communicate with a first representative STB device via first CPE client 214 and with a second representative STB device via second CPE client 222 (STB devices not explicitly shown in FIG. 2). In a particular embodiment, first CPE client 214 can be located at a first customer premise, and second CPE client 222 can be located at a second customer premise. In another particular embodiment, the first representative STB device and the second representative STB device can be located at a single customer premise, both coupled to one of CPE clients 214, 222. CPE clients 214, 222 can include routers, local area network devices, modems, such as digital subscriber line (DSL) modems, any other suitable devices for facilitating communication between an STB device and access network 266, or any combination thereof.

In an exemplary embodiment, client-facing tier 202 can be coupled to CPE clients 214, 222 via fiber optic cables. In another exemplary embodiment, CPE clients 214, 222 can include DSL modems that are coupled to one or more network nodes via twisted pairs, and client-facing tier 202 can be coupled to the network nodes via fiber-optic cables. CPE clients 214, 222 may be configured to process data received via access network 266, such as multimedia content provided by elements of MCDN system 200.

CPE clients 214, 222 can include MCDN STB devices; video gaming devices or consoles that are adapted to receive MCDN content; personal computers or other computing devices that are adapted to emulate STB device functionalities; any other device adapted to receive MCDN content and transmit data to an MCDN system via an access network; or any combination thereof.

In an exemplary, non-limiting embodiment, CPE clients 214, 222 can receive data, video, or any combination thereof, from client-facing tier 202 via access network 266 and render or display the data, video, or any combination thereof, at a display device, to which it is coupled. In an illustrative embodiment, CPE clients 214, 222 can include tuners that receive and decode television programming signals or packet streams for transmission to display devices, such as TV monitors. Further, CPE clients 214, 222 may include a processor and a memory device (not shown in FIG. 2) that is accessible to the processor. In one embodiment, the memory device may store executable instructions, such as embodied by a computer program.

In an illustrative embodiment, client-facing tier 202 may include a means for communicating between client-facing tier 202 and access network 266 and between client-facing tier 202 and private network 210. In one example, the communication means in client-facing tier 202 may be a network switch or sub-system (not shown in FIG. 2) that is coupled to one or more data servers, such as D-servers 232, that store, format, encode, replicate, or otherwise manipulate or prepare video content for communication from client-facing tier 202 to CPE clients 214, 222. The communication means in client-facing tier 202 can also be coupled to terminal server 234 that provides terminal devices with a point of connection to MCDN system 200 via client-facing tier 202. In a particular embodiment, communication means in client-facing tier 202 can be coupled to VOD server 236 that stores or provides VOD content imported by MCDN system 200. Further, the communication means in client-facing tier 202 may be coupled to one or more video servers 280 that receive video content and transmit the content to CPE clients 214, 222 via access network 266. The communication means in client-facing tier 202 can also be coupled to electronic store server 282 that stores and provides data related to purchasable assets to user devices, such as CPE clients 214, 222.

In an illustrative embodiment, client-facing tier 202 can communicate with a large number of clients, such as representative CPE clients 214, 222, over a wide geographic area, such as a metropolitan area, a viewing area, a statewide area, a regional area, a nationwide area or any other suitable geographic area, market area, or subscriber or customer group that can be supported by networking client-facing tier 202 to numerous CPE clients. In a particular embodiment, the communication means in client-facing tier 202, or any portion thereof, can include a multicast router or switch that communicates with multiple CPE clients via a multicast-enabled network.

As illustrated in FIG. 2, application tier 204 can communicate with both private network 210 and public network 212. Application tier 204 can include a means for communicating that can be coupled to application server 242 and to operations systems and support/billing systems and support (OSS/BSS) gateway 244. In a particular embodiment, application server 242 can provide applications to CPE clients 214, 222 via access network 266, which enable CPE clients 214, 222 to provide functions, such as interactive program guides, video gaming, display, messaging, processing of VOD material and other MCDN multimedia content, etc. In an illustrative embodiment, application server 242 can provide location information to CPE clients 214, 222. In a particular embodiment, OSS/BSS gateway 244 includes OSS data, as well as BSS data. In one embodiment, OSS/BSS gateway 244 can provide or restrict access to OSS/BSS server 264 that stores operations and billing systems data.

The means for communicating in application tier 204 can be coupled to domain controller 246 that provides Internet access, for example, to users at their computers 268 via public network 212. For example, domain controller 246 can provide remote Internet access to IPTV account information, e-mail, personalized Internet services, or other online services via public network 212. In addition, the means for communicating in application tier 204 can be coupled to subscriber and system store 248 that includes account information, such as account information that is associated with users who access MCDN system 200 via private network 210 or public network 212. In an illustrative embodiment, subscriber and system store 248 can store subscriber or customer data and create subscriber or customer profiles that are associated with IP addresses, stock-keeping unit (SKU) numbers, other identifiers, or any combination thereof, of corresponding CPE clients 214, 222. In another illustrative embodiment, the subscriber and system store can store data associated with capabilities of STB devices associated with particular customers.

In a particular embodiment, application tier 204 can include client gateway 250 that communicates data directly to client-facing tier 202. In this embodiment, client gateway 250 can be coupled directly to client-facing tier 202. Client gateway 250 can provide user access to private network 210 and other tiers coupled thereto. In an illustrative embodiment, CPE clients 214, 222 can access MCDN system 200 via access network 266, using information received from client gateway 250. User devices can access client gateway 250 via access network 266, and client gateway 250 can allow such devices to access private network 210 once the devices are authenticated or verified. Similarly, client gateway 250 can prevent unauthorized devices, such as hacker computers or stolen CPE from accessing private network 210, by denying access to these devices beyond access network 266.

For example, when a first representative CPE client 214 accesses client-facing tier 202 via access network 266, client gateway 250 can verify subscriber information by communicating with subscriber and system store 248 via private network 210. Further, client gateway 250 can verify billing information and status by communicating with OSS/BSS gateway 244 via private network 210. In one embodiment, OSS/BSS gateway 244 can transmit a query via public network 212 to OSS/BSS server 264. After client gateway 250 confirms subscriber and/or billing information, client gateway 250 can allow CPE client 214 to access MCDN content and VOD content at client-facing tier 202. If client gateway 250 cannot verify subscriber information for CPE client 214, e.g., because it is connected to an unauthorized twisted pair, client gateway 250 can block transmissions to and from CPE client 214 beyond access network 266.

In FIG. 2, acquisition tier 206 may include a means for communication (not shown in FIG. 2) with private network 210, that can also communicate with operations and management tier 208 via public network 212. In a particular embodiment, the communication means in acquisition tier 206 can be coupled to live acquisition server 254 that receives or acquires television content, movie content, advertisement content, other video content, or any combination thereof, from broadcast service 256, such as a satellite acquisition system or satellite head-end office. In a particular embodiment, live acquisition server 254 can transmit content to the communication means in acquisition tier 206, which can transmit the content to client-facing tier 202 via private network 210.

In an illustrative embodiment, multimedia content can be transmitted to D-servers 232, where it can be encoded, formatted, stored, replicated, or otherwise manipulated and prepared for communication from video server(s) 280 to CPE clients 214, 222. Client-facing tier 202 can receive content from video server(s) 280 and communicate the content to CPE 214, 222 via access network 266. STB devices can receive the content via CPE 214, 222, and can transmit multimedia content to television monitors (not shown in FIG. 2). In an illustrative embodiment, video or audio portions of the multimedia content can be streamed to CPE clients 214, 222.

Further, acquisition tier 206 can be coupled to a VOD importer server 258 that receives and stores television or movie content received at acquisition tier 206 and communicates the stored content to VOD server 236 at client-facing tier 202 via private network 210. Additionally, at acquisition tier 206, VOD importer server 258 can receive content from one or more VOD sources outside MCDN system 200, such as movie studios and programmers of non-live content. VOD importer server 258 can transmit the VOD content to acquisition tier 206, which can communicate the material to client-facing tier 202 via private network 210. The VOD content can be stored at one or more servers, such as VOD server 236.

When users issue requests for VOD content via CPE clients 214, 222, the requests can be transmitted over access network 266 to VOD server 236, via client-facing tier 202. Upon receiving such requests, VOD server 236 can retrieve the requested VOD content and transmit the content to CPE clients 214, 222 across access network 266. In an illustrative embodiment, video or audio portions of VOD content can be streamed to CPE clients 214, 222.

In FIG. 2, operations and management tier 208 can include a means for communication (not shown in FIG. 2) that conducts communication between operations and management tier 208 and public network 212. The communication means in operations and management tier 208 may be coupled to TV2 server 262. Additionally, communication means in operations and management tier 208 can be coupled to OSS/BSS server 264 and to simple network management protocol (SNMP) monitor 286 that monitors network devices within or coupled to MCDN system 200. In a particular embodiment, the communication means in operations and management tier 208 can communicate with acquisition tier 206 via public network 212.

In an illustrative embodiment, live acquisition server 254 can transmit content to acquisition tier 206, which can transmit the content to operation and management tier 208 via public network 212. In this embodiment, operation and management tier 208 can transmit the content to TV2 server 262 for display to users accessing the user interface at TV2 server 262. For example, a user can access TV2 server 262 using personal computer 268 coupled to public network 212.

In a particular illustrative embodiment, client-facing tier 202 can provide media content, such as video content, to CPE client 214. The media content can include a selectable trigger, which may be provided by CPE client 214 to a display device as a popup within a video display. Client-facing tier 202 may receive data related to selection of the selectable trigger. In response to receiving the data, electronic store server 282 may provide a GUI including an electronic storefront to CPE client 214 for display at a display device, such as a TV monitor (not shown in FIG. 2). The electronic storefront can include data related to multiple purchasable assets as well as multiple options for purchasing one or more of the assets.

In another particular illustrative embodiment, CPE client 214 receives media content including an embedded trigger. CPE client 214 identifies the embedded trigger and provides a popup to TV monitor that is related to the embedded trigger. The popup can include information related to a particular promotion and an invitation to access an electronic storefront. A user may utilize a remote control device to request the electronic storefront. CPE client 214 may receive an input from the remote control device and transmit a request to client-facing tier 202 for the electronic storefront. The request may include an identifier related to the selected media content, an identifier related to CPE client 214, an account identifier associated with CPE client 214, an identifier associated with the electronic storefront, or any combination thereof. In a particular embodiment, in response to sending the request, CPE client 214 may receive a GUI that includes an electronic storefront that has multiple purchasable assets and multiple selectable payment options. CPE client 214 may provides the GUI to as a TV monitor (not shown in FIG. 2). In one embodiment, CPE client 214 can receive data that can be executed by a processor to generate a GUI that includes an electronic storefront that has multiple purchasable assets and multiple selectable payment options. CPE client 214 can provide the generated GUI to a display device for display. A user may utilize a remote control device to purchase one or more assets and to select a payment option related to the purchase. CPE client 214 may send an asset identifier and purchase information to E-store server 282 for fulfillment.

Figure 3:
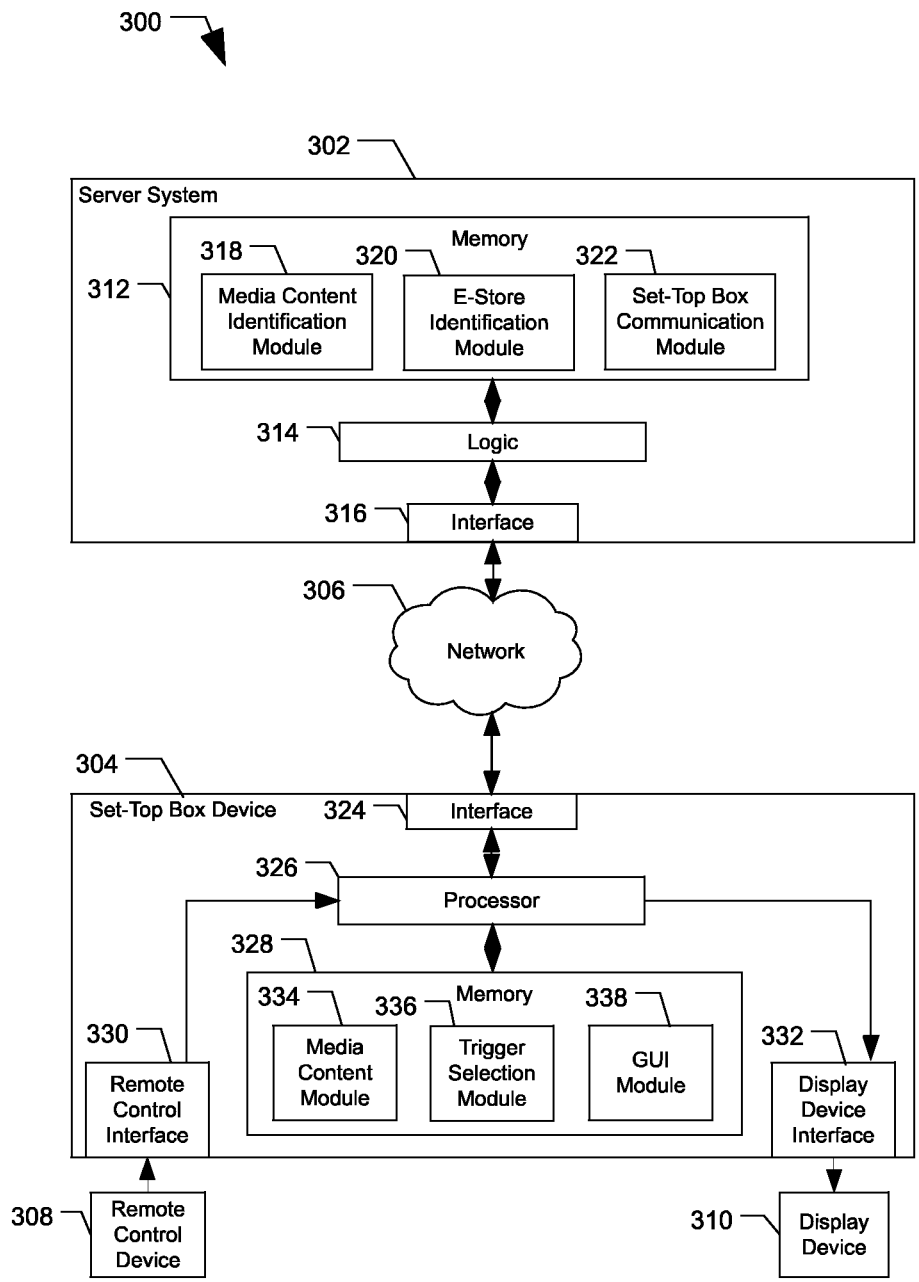
FIG. 3 is a block diagram of selected elements of an embodiment of a multimedia content distribution network.

FIG. 3 is a block diagram of a third particular illustrative embodiment of system 300 to present assets related to media content. System 300 includes server system 302 that communicates with CPE at a client system, represented in FIG. 3 by STB device 304, via network 306, which may be the public Internet or an MCDN. Server system 302 includes interface 316 to network 306, processing logic 314 and memory 312 that is accessible to processing logic 314.

In a particular embodiment, memory 312 includes media content identification module 318 that can be executed by processing logic 314 to identify media content received at STB device 304. Media content identification module 318 may also be used to transmit media content to STB device 304. The media content may include an embedded selectable trigger, which can be executed at STB device 304 to generate a popup within the video at display device 310. Memory 312 may also include electronic store (e-store) identification module 320 that can be executed by processing logic 314 to identify assets. E-store identification module 320 may also be executed by processing logic 314 to generate an electronic storefront, including a GUI presenting the identified assets. Memory 312 may also include STB communication module 322 that can be executed by processing logic 314 to communicate with STB device 304 to receive requests for an electronic storefront related to media content and to communicate the generated electronic storefront to STB device 304. In a particular illustrative embodiment, STB communication module 322 may also receive data related to purchase orders and payment option selections from STB device 304.

STB device 304 may includes interface 324 to network 306. STB device 304 may also include processor 326 coupled to interface 324 and memory 328 that is accessible to processor 326. STB device 304 may also include remote control interface 330 that communicates with remote control device 308 and display device interface 332 that communicates with display device 310. In a particular embodiment, memory 328 includes media content module 334 that is executable by processor 326 to receive media content from server system 302 (or from another content source) via network 306. Memory 328 may include trigger selection module 336 that is executable by processor 326 to identify an embedded selectable trigger within the media content and to generate a selectable popup within the video at the display device based on the embedded trigger. Trigger selection module 336 may also be executed by processor 326 to receive a selection related to the selectable popup via remote control device 308 and to communicate data related to the selection to server system 302 via the network. Memory 328 may also include GUI module 338 that is executable by processor 326 to receive instructions related to an electronic storefront and to generate a GUI that can be provided to display device 310 that includes one or more selectable indicators related to purchasable assets.

In a particular illustrative embodiment, e-store identification module 320 may be executed to select an electronic storefront from a plurality of stored electronic storefronts based on media content received at STB device 304. In another particular illustrative embodiment, e-store identification module 320 can be executed to generate the electronic storefront dynamically, such that the GUI includes an electronic storefront having a first selectable element related to a first asset and a second selectable element related to a second asset (both selected based on the media content). The GUI can also include multiple payment options that are related to a first selectable element and a second selectable element. In a particular illustrative embodiment, the multiple payment options can include an electronic coupon payment option, account billing option to bill a subscriber account associated with the destination device (i.e., the STB device), a credit card option, a debit card option, other payment options, or any combination thereof.

In a particular illustrative embodiment, STB device 304 receives media content including an embedded trigger from server system 302. STB device 304 identifies the embedded trigger and provides the media content and a popup based on the embedded trigger to display device 310. STB device 304 receives an input from remote control device 308 that is related to the popup. STB device 304 sends a request to server system 302 based on the input. The request may include an identifier related to the media content, an identifier associated with STB device 304, a subscriber account identifier, an electronic storefront identifier, other information, or any combination thereof. STB device 304 receives data related to an electronic storefront based on the request, and provides a user interface to display device 310 that includes the electronic storefront. The electronic storefront includes one or more selectable indicators related to purchasable assets. The electronic storefront also includes one or more payment options for purchasing selected assets. Set-top box device 304 receives a selection of at least one indicator and a selected payment option and sends data related to the selection and the selected payment option to server system 302 to complete a purchase transaction.

In a particular embodiment, if the purchased asset is an electronic asset, server system 302 may provide instructions for downloading the asset, may send the purchased asset, may perform other actions, or any combination thereof. If the purchased asset is a tangible object, server system 302 may transmit a purchase order fulfillment request to a fulfillment center (not shown) to complete the packaging and shipping of the purchased asset. Server system 302 may also notify an inventory system (not shown) to update inventory data based on the purchase.

Figure 4:
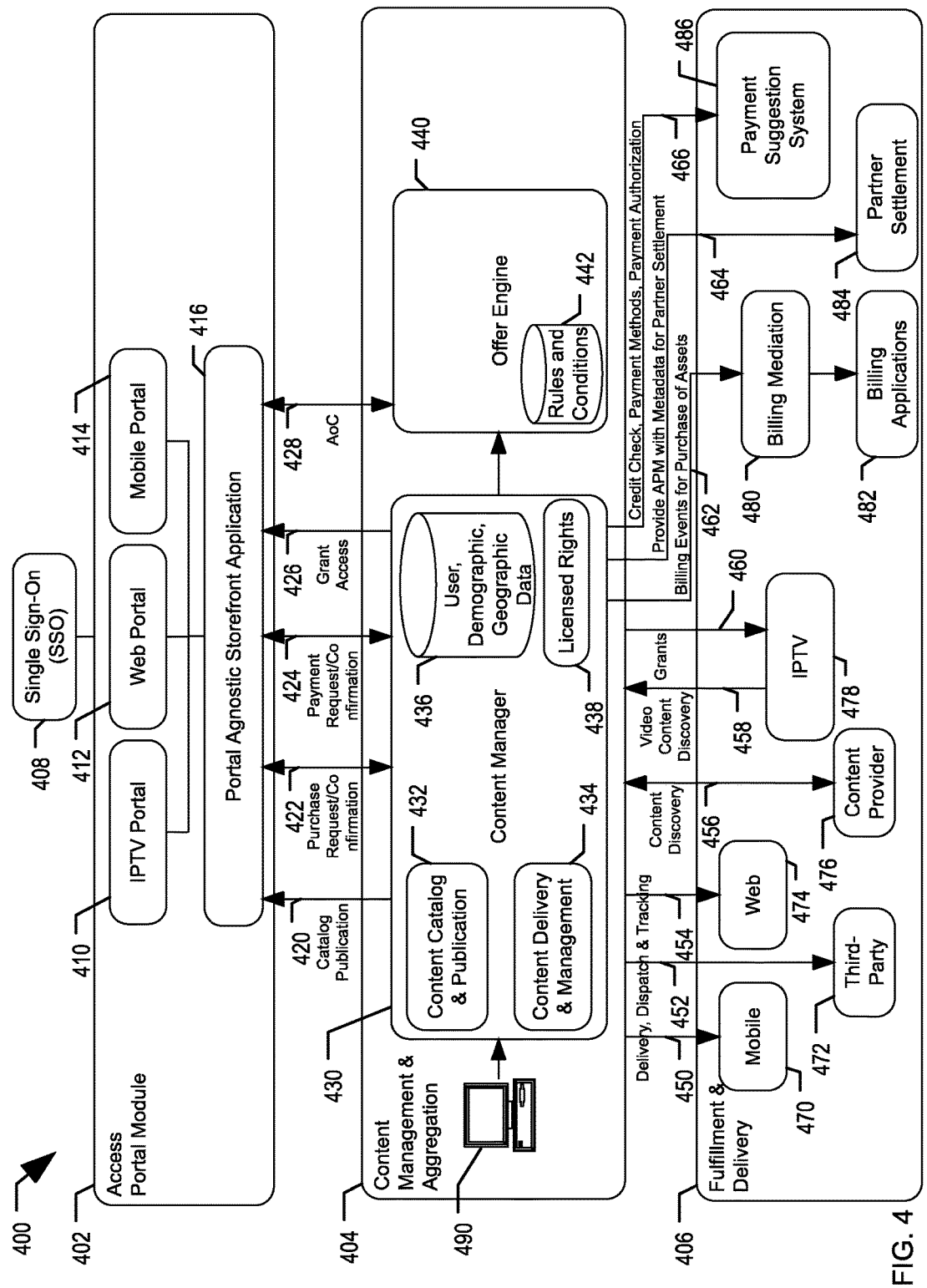
FIG. 4 is a block diagram of selected elements of an embodiment of a multimedia content distribution network.

FIG. 4 is a block diagram of an illustrative embodiment of system 400 to present assets related to media content. System 400 may include single sign on (SSO) interface 408 to communicate with one or more of a plurality of access points at access portal module 402. The access points may include representative access points, such as IPTV portal 410, web portal 412, and mobile portal 414. Access portal module 402 also includes portal agnostic storefront application 416. Portal agnostic (also referred to herein as "unified") storefront application 416 may send data related to a storefront display via the various access portals 410, 412, 414 to a user device that is signed on via SSO interface 408.

System 400 also includes content management and aggregation module 404 having content manager 430, offer engine 440 and administration device 490. Administration device 490 may communicate with content management and aggregation module 404, fulfillment and delivery module 406, and access portal module 402 to allow administrative configuration of each module. For example, administrative device 490 may be used to establish offer management rules stored at rules and conditions database 442. In another example, administrative device 490 may be used to configure a storefront display provided via access portal module 402. In another example, administrative device 490 may be used to configure fulfillment and delivery module 406.

In a particular embodiment, content manager 430 includes content catalog and publication module 432, which may identify assets that are available to be offered for sale. For example, content delivery and management module 434 may query content providers, such as content providers 476, to identify assets that are available for purchase. Catalog and publication module 432 may process data received from content providers 476 to identify metadata related to available assets, such as a description of the content of an asset, a format of the asset, a type of the asset, a cost of the asset, other information about the asset, or any combination thereof. Content catalog and publication module 432 may provide catalog publication output 420 to portal agnostic storefront application 416 identifying the available assets. Content catalog and publication module 432 may also provide information identifying the available assets to offer engine 440 to allow offer rules related to the assets to be configured.

In a particular embodiment, content manager 430 may also include content delivery and management module 434. Content delivery and management module 434 may manage delivery of purchased assets to user devices. For example, content delivery and management module 434 may receive payment information for the purchase of an asset via portal agnostic storefront application 416. Content delivery and management module 434 may send an access grant message to a content provider after payment for an asset has been received and approved. The grant message may authorize the content provider to send the content of the purchased asset to the purchasing user device or another user device.

In a particular embodiment, content manager 430 may also include user database 436. User database 436 may include user data, such as demographic information and geographic information. User database 436 may be utilized to establish promotional offers, to identify subscribers to which promotional offers should be made, to implement offer rules, and so forth. For example, offer engine 440 may access user database 436 in order to determine whether a particular offer applies to a particular subscriber based on the subscriber data.

In a particular embodiment, content manager 430 may also include license rights module 438. License rights module 438 may implement rules to ensure the license rights associated with digital assets are complied with. For example, license rights module 438 may ensure that royalties associated with digital assets are paid. In another example, license rights module 438 may determine an amount owed to a content provider or third party resulting from the purchase of a digital asset.

In a particular embodiment, fulfillment and delivery module 406 may include a variety of fulfillment modules including mobile module 470, third party content module 472, web module 474, dedicated content provider module 476 and IPTV module 478. Fulfillment modules 470, 472, 474, 476 and 478 provide data identifying assets available for purchase to content manager 430. In a particular embodiment, fulfillment modules 470, 472, 474, 476 and 478 may also send data including the content of a purchased asset to a user device.

In a particular embodiment, fulfillment and delivery module 406 may include one or more transaction application modules, such as billing mediation module 480, billing applications module 482, partner settlement module 484, and payment suggestion system 486. Billing mediation module 480 may receive data related to the purchase of assets, e.g., billing events data, from content manager 430 and may determine a charge for the purchase based on the data. Billing mediation module 480 may pass data related to the purchase to billing applications module 482. Billing applications module 482 may prepare a bill to charge a subscriber for the purchase of an asset. For example, billing application module 482 may add the charge to a unified subscriber bill for communication services, such as wireless telephone service, telephone service, television service (e.g., IPTV service), Internet access service, other communication services, or any combination thereof.

In a particular embodiment, partner settlement module 484 may receive information associated with the purchase of an asset from content manager 430. Partner settlement module 484 may process the purchase information to determine an amount owed to another party, such as a content provider, license rights holder, fulfillment agent, or other party as a result of the purchase. Partner settlement module 484 may execute payment of the owed amount or pass information related to the owed amount to a payment system.

In a particular embodiment, payment suggestion system 486 may also receive data from content manager 430 related to the purchase of an asset. The purchase information may include a purchase price and information about the user. Payment suggestion system 486 may determine available payment options for the user, such as a charge to the user's account (e.g., a communication services account), payment by credit card, payment by electronic funds transfer, other payment options, or any combination thereof.

Content management and aggregation module 404 may communicate with fulfillment and delivery module 406 via a plurality of communication links. Representative examples of the communication links may include delivery, dispatch and tracking communication links 450, 452, 454, content discovery communication link 456, video content discovery link 458, and IPTV access grant communication link 460. In addition, content management and aggregation module 404 may communicate with the transaction application modules of fulfillment and delivery module 406 via billing event communication link 462, partner settlement communication link 464, and credit check and payment authorization communication link 466.

Content manager 430 may communicate with portal agnostic storefront application 416 via a plurality of communication links 420, 422, 424, 426 and 428. Representative examples of the communication links may include catalog publication communication link 420 to provide information about available assets, purchase request/confirmation communication link 422 to communicate purchase request and purchase confirmation information, grant access communication link 426 to communicate access grants, and payment request confirmation communication link 424 to communicate payment request and confirmation information. In addition, offer engine 440 may communicate with portal agnostic storefront application 416, for example, via advice of change (AOC) communication link 428.

During operation of a particular embodiment, content manager 430 may prepare a catalog of assets available for purchase and provide the catalog of assets to administration device 490 for configuration of offer rules and conditions related to the assets. Offer engine 440 may implement the offer rules and conditions to promote the assets in the catalog via a storefront display sent to user devices via portal agnostic storefront application 416. Content manager 430 may receive requests for purchase of such assets via portal agnostic (i.e., unified) storefront application 416. Offer engine 440 may provide an AOC to the subscriber associated with the purchase via portal agnostic storefront application 416. If the subscriber approves the charge, content manager 430 may send payment information to transaction application modules 480, 482, 484, 486 and may communicate with fulfillment and delivery module 406 in order to fulfill the purchase.

In a particular embodiment, after purchase of the asset, portal agnostic storefront application 416 may provide the content of the electronic asset via a suitable interface based on the asset type. For example, an IPTV-related asset may be provided via IPTV portal 410, an Internet asset may be available via web portal 412, and a mobile asset may be available via mobile portal 414. In certain embodiments, electronic assets may be offered and/or made available by at least one of IPTV portal 410, web portal 412, and mobile portal 414. That is, the same electronic asset may be made available via different portals 410, 412, 414. Additionally, content manager 430 may interact with fulfillment and delivery module 406 to provide billing information necessary to bill the subscriber for the asset purchase and to pay content providers or other third parties for the transaction.

Figure 5:
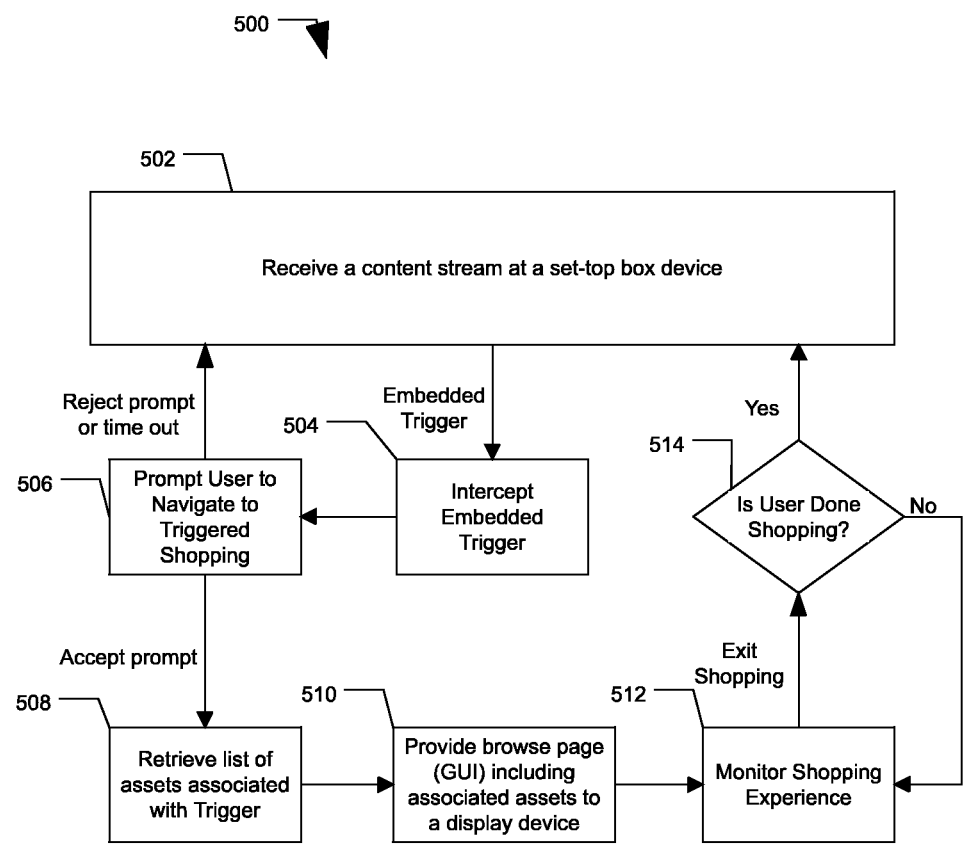
FIG. 5 is an embodiment of a method for presenting assets related to multimedia content.

FIG. 5 is a flow diagram of a particular illustrative embodiment of method 500 for presenting assets related to media content. A content stream may be received at an STB device (operation 502). The STB device may intercept an embedded trigger (operation 504). The STB device may prompt a user to navigate to an electronic storefront, also known as triggered shopping (operation 506). If the user does not respond (i.e., a time out occurs) or if the user rejects the prompt, the method may return to operation 502. If the user accepts the prompt, the STB device may retrieve a list of assets associated with the trigger (operation 508). The STB device may provide a browse page (GUI) including the associated assets to a display device (operation 510). The STB device may monitor the shopping experience (operation 512). A decision may be made by the STB device if the user is done shopping (operation 514). If the result of the decision is NO, the method may return to operation 512 and the STB device may continue to monitor the shopping experience. If the result of the decision is YES, the customer is done shopping, the method may advance to operation 502.

Figure 6:
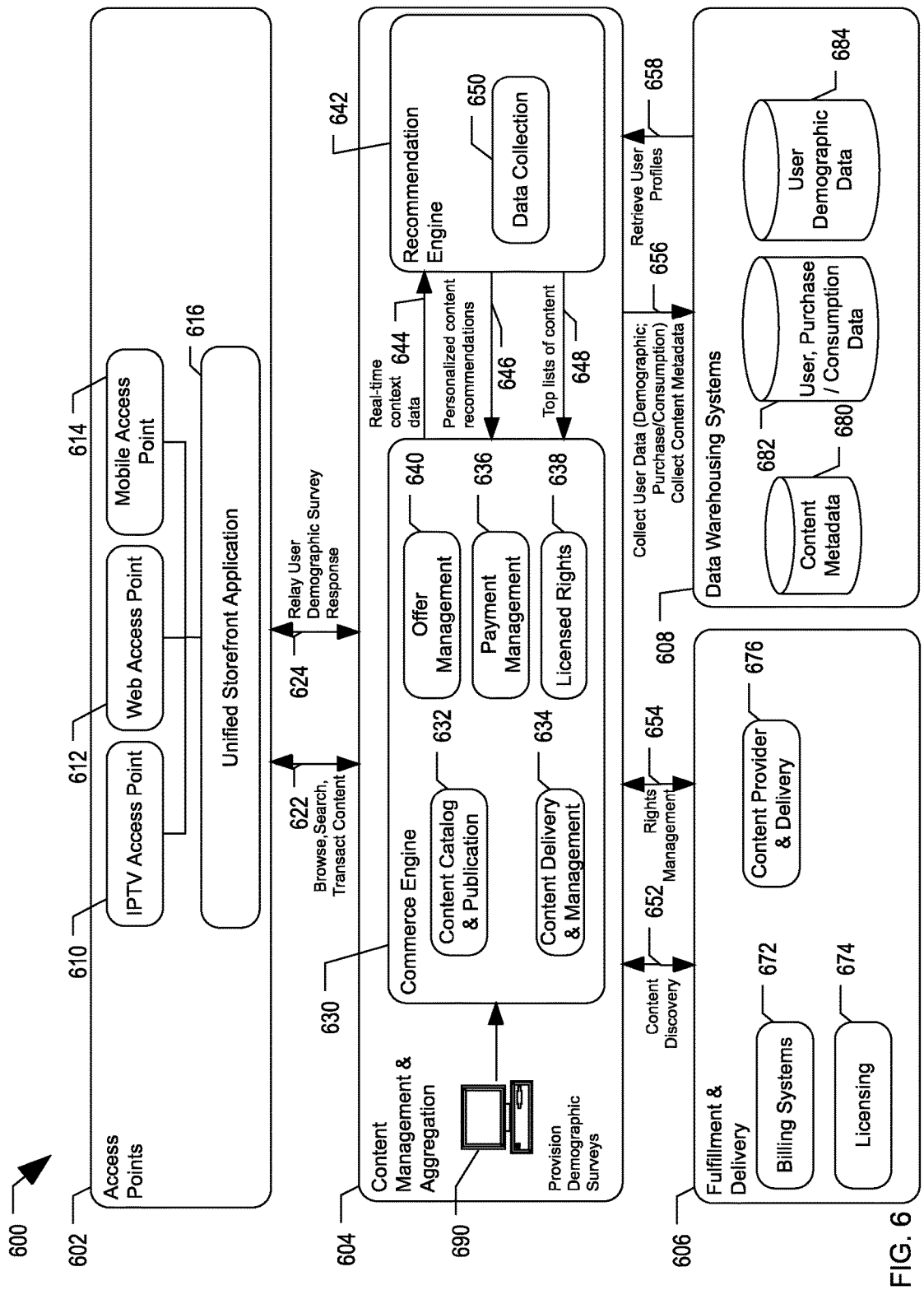
FIG. 6 is a block diagram of selected elements of an embodiment of a multimedia content distribution network.

FIG. 6 is a block diagram of an illustrative embodiment of system 600 to present recommendations for assets related to media content. System 600 may include access points module 602, content management and aggregation module 604, fulfillment and delivery module 606, and data warehousing systems 608, as will be described in detail below. It is noted that certain elements depicted in system 600 are similar to corresponding elements in system 400 (see FIG. 4).

System 600 may include one or more of a plurality of access points in access points module 602, which may include IPTV access point 610, web access point 612, and mobile device access point 614. Access points module 602 may also include USF application 616. USF application 616 may send data related to a storefront display via access points 610, 612, and 614 to a user device that is signed on, for example with a registered account for an MCDN.

Access points module 602 may communicate with content management and aggregation module 604 via a plurality of communication links. In particular, access points module 602 may transfer user input along with corresponding displayed information for browsing, searching and transacting content, represented in FIG. 6 as 622, to content management and aggregation module 604. In some embodiments, 622 may represent information exchanged via a user interface provided by USF application 616. In addition, user demographic survey information 624, along with consumption information for a user of USF application 616, may be communicated between modules 602 and 604.

System 600 may also include content management and aggregation module 604 having commerce engine 630, recommendation engine 642 and administration device 690. Administration device 690 may communicate with content management and aggregation module 604, fulfillment and delivery module 606, and access points module 602 to allow administrative configuration of each module. For example, administration device 690 may be used to provision demographic surveys for obtaining consumption information. In another example, administrative device 690 may be used to configure a storefront display, such as a USF display, provided via access points module 602. In another example, administration device 690 may be used to configure fulfillment and delivery module 606.

In a particular embodiment, commerce engine 630 includes content catalog and publication module 632, which may identify assets that are available to be offered for sale. For example, content delivery and management module 634 may query content providers, such as the content provider and delivery 676, to identify assets that are available for purchase. Content catalog and publication module 632 may also provide information identifying the available assets to offer management module 640 to allow offer rules related to the assets to be configured. Commerce engine 630 may also include content delivery and management module 634. Content delivery and management module 634 may manage delivery of purchased assets to user devices. Content delivery and management module 634 may send an access grant message to a content provider after payment for an asset has been received and approved by payment management module 636. The grant message may authorize the content provider to send the content of the purchased asset to the purchasing user device or another user device. Commerce engine 630 may also include licensed rights module 638. Licensed rights module 638 may implement rules to ensure the license rights associated with digital assets are complied with. Licensed rights module 638 may obtain licenses from third-parties via licensing module 674.

In a particular embodiment, fulfillment and delivery module 606 may include a variety of fulfillment modules including content provider and delivery module 676, billing systems module 672, and licensing module 674. Fulfillment and delivery module 606 may include one or more transaction application modules, such as billing systems module 672. Billing systems module 672 may receive data related to the purchase of assets, e.g., billing events data, and may determine a charge for the purchase based on the data. Billing systems module 672 may prepare a bill to charge a subscriber for the purchase of an asset. In one example, billing systems module 672 may add the charge to a unified subscriber bill for communication services, such as wireless telephone service, telephone service, television service (e.g., IPTV service), Internet access service, other communication services, or any combination thereof. Licensing module 674 may enforce licenses and encode content to prevent unauthorized access.

Content management and aggregation module 604 may communicate with fulfillment and delivery module 606 via a plurality of communication links. Representative examples of the communication links may include content discovery communication link 652 and rights management communication link 654.

During operation of a particular embodiment, commerce engine 630 may prepare a catalog of assets available for purchase, including recommendations for content provided by recommendation engine 642. In particular, commerce engine 630 may forward real-time context data 644 related to current activity by a user of USF application 616 to recommendation engine 642. Recommendation engine 642 may collect real-time context data 644, along with other consumption information, in data collection 650. Recommendation engine 642 may forward contents of data collection 650 for aggregation by data warehousing systems 608. Data collection 650 may include metadata for multimedia content indexed to a user profile, representing personalized preferences which may be used to generate recommended collections of multimedia content, represented by personalized content recommendations 646. The consumption information used at least in part to generate the collection may depend on a geographical location of the user, a time of day, consumer information, or a combination thereof.

Recommendation engine 642 may also provide recommendations for users for which personalized profiles are not available, for example, new users who may not have a substantial consumption history. Data collection 650 may be used to retrieve collections of recommended content from data warehousing systems 608 based on consumption information for a plurality of users representing a subscriber base of an MCDN system. For example, the consumption information may include a ranking of most purchased content, most viewed or played content, and highest rated content. The highest rated content may be evaluated based on ratings provided by the plurality of users. The rankings may be compiled and provided to commerce engine 630 by recommendation engine 642 in the form of top lists of content 648.

It is noted that either personalized content recommendations 646 or top lists of content 648 may be VOD programs categorized according to a number of criteria, including, but not limited to: genre, studio, duration, era or release year, sales revenue, language, media-type or format, performer, director, producer, investor, author, shooting location, trade association rating, content warnings, crew members, award information, and any combination thereof.

Still further, recommendation engine 642 may use voluntarily provided demographic information, such as customer demographic survey responses 624, to generate content recommendations 646 or top lists of content 648. The demographic information may be provided by a user of USF application 616, who may also be referred to as a consumer of the multimedia assets provided. The demographic information may include consumption information, including, but not limited to: user favorites, birth date or age of the user, user gender, user geographic information, user socio-economic information, user family information, user political information, user ratings for multimedia content, and any combination thereof.

The recommended collections of multimedia content, including at least one obtainable multimedia asset, may be presented to the user via USF application 616. The presentation may be in the form of a GUI, configured to allow selection and purchase of rights to multimedia assets. As used herein, "obtainable" describes multimedia assets for which certain rights are available, or may be offered for purchase, to a user (e.g., a consumer or subscriber). The rights that may be purchased, i.e., obtained, may include rental or ownership rights to multimedia assets. The rights may include digital rights that may be restricted by user, duration, number of playbacks, time/date of playback, playback location, playback device, playback quality, copy or forward ability, or other limitations. Thus, as used herein, a "purchase", a "purchase transaction", or a "purchase request" for an asset refers to obtaining certain rights to the asset, which may or may not be unrestricted ownership rights.

The user may select and provide user input indicating a desire to purchase the selected asset using USF application 616. USF application 616 may then initiate a purchase transaction, by obtaining billing information, and forward a purchase request, as described in detail above. After receiving approval for the purchase of the asset, USF application 616 may provide the content of the electronic asset to the user via at least one of IPTV access point 610, web access point 612, and mobile device access point 614. In some instances, USF application 616 provides access via a suitable interface based on the asset type. For example, IPTV-related assets may be provided via IPTV access point 610, an Internet asset may be available via web access point 612, and a mobile asset may be available via mobile device access point 614. In certain embodiments, electronic assets may be offered and/or made available by at least two of IPTV access point 610, web access point 612, and mobile device access point 614.

Content management and aggregation module 604 may communicate with data warehousing systems 608 via a plurality of communication links. Data warehousing systems 608 may receive user data and content metadata, represented in FIG. 6 by 656. The user data may include demographic data and purchase/consumption data. Data warehousing systems 608 may provide user profiles 658, including content metadata user data indexed to individual users.

As shown in FIG. 6, data warehousing systems 608 may include various data stores, or databases, including content metadata 680, user purchase/consumption data 682, and user demographic data 684. Content metadata 680 may include information on multimedia content or assets consumed by subscribers or consumers, and may be indexed or categorized for various criteria, as described above. User purchase/consumption data 682 may reflect purchase or consumption histories for users. User demographic data 684 may include user data, such as demographic information and geographic information. Databases 680, 682, 684 may be utilized to establish promotional offers, to identify users to which promotional offers should be made, to implement offer rules, identify collections of multimedia content to recommend to users, or identify subscriber groups for recommendations, among other uses. For example, recommendation engine 642 may access data warehousing systems 608 in order to determine multimedia assets to include in a collection of recommended content provided to a user of USF application 616.

Figure 7:
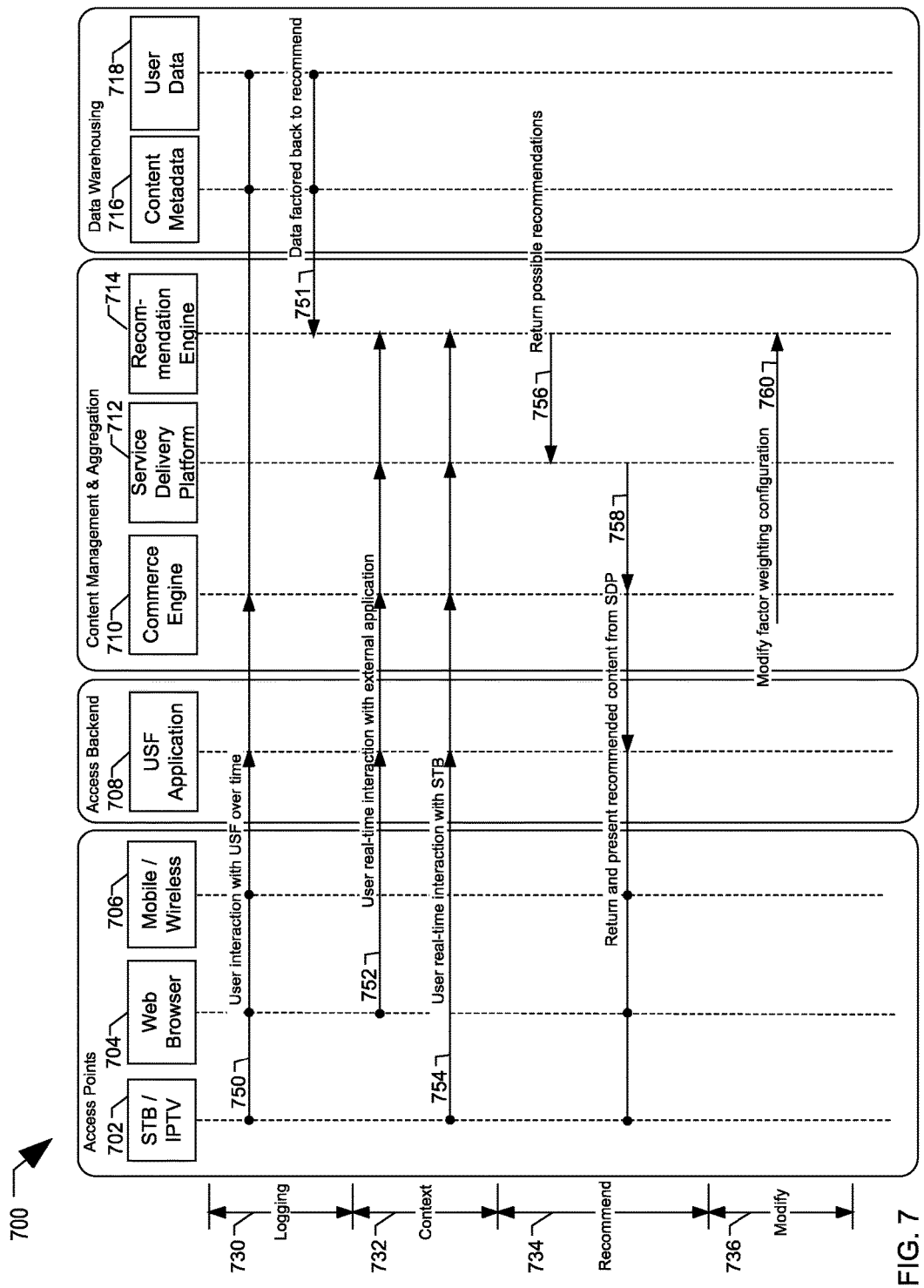
FIG. 7 is an embodiment of a method for recommending assets related to multimedia content.

Referring to FIG. 7, a ladder diagram of an embodiment of method 700 for recommending electronic assets is shown. Method 700 includes various stages including logging stage 730, context stage 732, recommend stage 734, and modify stage 736.

In connection with logging stage 730, a user may interact with the USF application 708 over time resulting in consumption information being logged by a data warehousing system. Interactions 750 from which data are gathered may occur from any access point, such as STB/IPTV 702, web browser 704, and mobile wireless 706. In addition, interactions 750 may represent voluntary demographic information provided by the user in response to a questionnaire, which may be accessible across any of access points 702, 704, 706. The questionnaire may allow a user to provide the following information: gender, age, preferred genres, genre frequency, preferred content types, and other categories, as described above. The questionnaire may be provided to new users and may be updated as desired, or on a regular basis.

Interactions 750 may be collected by commerce engine 710 to facilitate the building of consumer/subscriber/user profiles by the data warehousing system. The data warehousing system may log content metadata 716 and user data 718, as described above (see FIG. 6). The data captured by the data warehousing system in a user profile may include content purchasing history, voluntary user demographics, browsing history, playback history, linear content viewing history, digital video recorder (DVR) history, deletion history, and content metadata.

Recommendation engine 714 may further receive previously gathered user profiles, including content metadata 716 and user data 718, shown in FIG. 7 as data 751. Data 751 may be used by recommendation engine 714 to factor back into recommendations, such as collections of recommended multimedia content. In some instances, a portion of data 751 may be maintained locally by recommendation engine 714 to improve performance or for other reasons.

In connection with context stage 732, the real-time interaction of the user with STB/IPTV 702 or an external web application may be used to generate context information. Interaction 752 by the user in real-time may be obtained for an external web application using web browser 704, while interaction 754 by the user in real-time may be obtained for an MCDN, represented by an MCDN client device, STP/IPTV 702. Interactions 752, 754 may generate context information that is provided by USF application 708 to commerce engine 710. The relevant context information might include user account information, current content being viewed, current category being browsed, list of promotions viewed, search criteria, and other information. Commerce engine 710 may further provide content metadata based on context information to service delivery platform (SDP) 712. Recommendation engine 714 may obtain real-time context data from SDP 712. In some embodiments, web browser 704 may be executed using a mobile/wireless platform 706 and may be used to collect real-time user context data.

In connection with recommend stage 734, recommendation engine 714 may return possible recommendations 756 to SDP 712. Recommendation engine 714 may use previously gathered user data, such as collected by interaction 750 and factored back as 751, along with real-time contextual data, collected by interactions 752, 754, to generate personalized collections of recommended multimedia content. In certain instances, recommendation engine 714 may return top lists, such as most purchased, most played, and highest rated, for users without an established profile or consumption history. The top lists may be generated from a population of established users and may be categorized according to voluntary demographic information provided by the receiving user. Recommended content 758 may be returned by the SDP 712 to commerce engine 710 for forwarding to USF application 708, from where it may be presented to the user. The SDP 712 may filter possible recommendations 756 based on various criteria, for example, based on availability, user qualification, or a licensing/user rights matrix to generate recommended content 758. USF application 708 may present recommended content 758 to the user on any one or more access points 702, 704, 706, from where multimedia assets in the collection of recommended content 758 may be selected, purchased, and obtained for consumption by the user, according to the methods described herein.

In connection with modify stage 736, factor weighting configurations 760, which lead to the generation of recommendations, may be modified in recommendation engine 714. Modification of factor weighting configurations 760 may be performed by a service provider of MCDN system 200 (see FIG. 2) to adjust or tune the effectiveness of the recommendation method 700, based on feedback, consumption metrics, revenue growth, etc.

Figure 8:
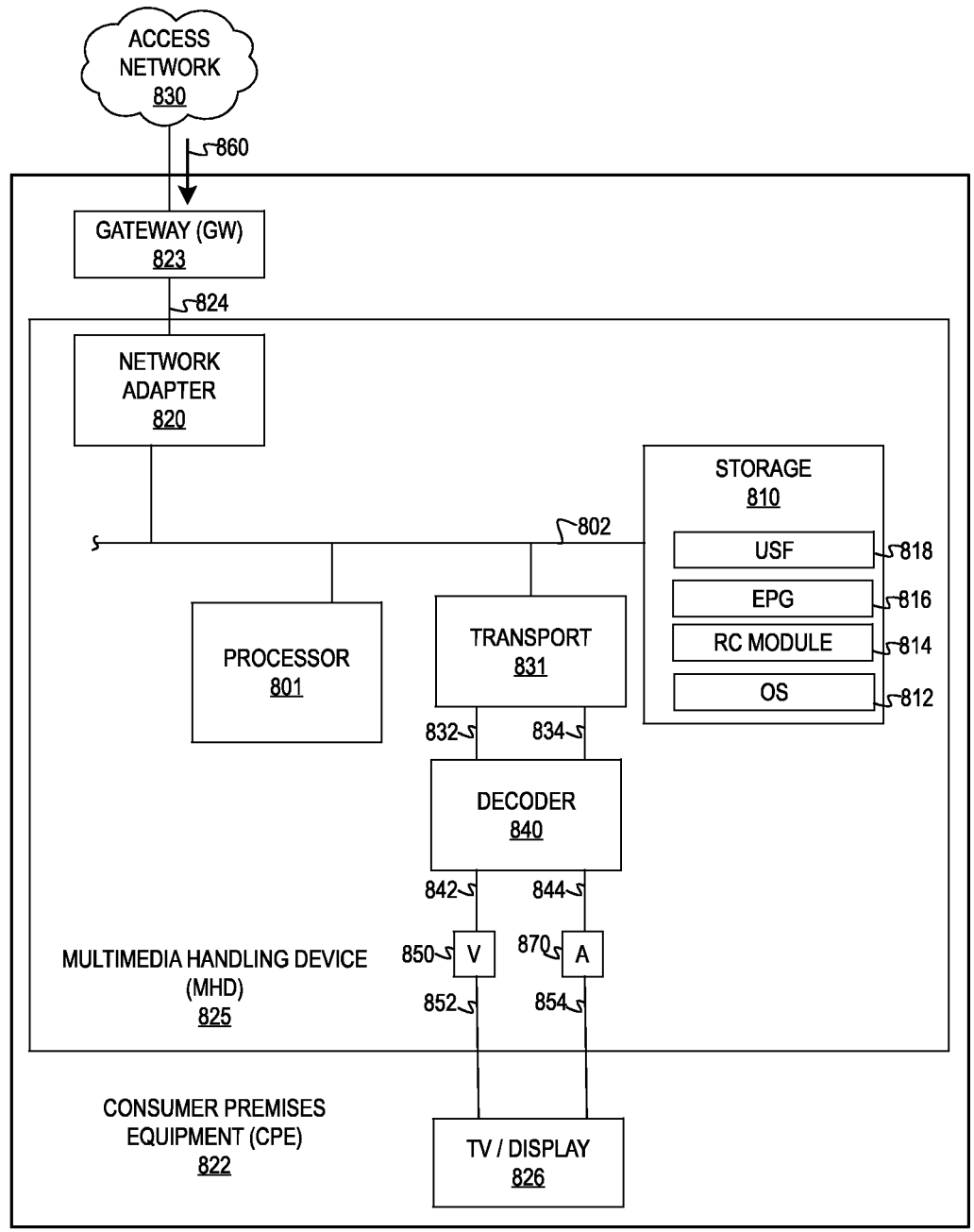
FIG. 8 illustrates an embodiment of a multimedia handling device.

Referring now to FIG. 8, a block diagram illustrating selected elements of an embodiment of multimedia handling device (MHD) 825 is presented. In FIG. 8, MHD 825 is shown as a functional component of CPE 822 along with gateway (GW) 823 and display 826, independent of any physical implementation. In particular, it is noted that CPE 822 may be any combination of GW 823, MHD 825 and display 826. In some cases, MHD 825 represents an embodiment of an STB device.

In the embodiment depicted in FIG. 8, MHD 825 includes processor 801 coupled via shared bus 802 to storage media collectively identified as storage 810. MHD 825, as depicted in FIG. 8, further includes network adapter 820 that interfaces MHD 825 to local area network (LAN) 824 and through which MHD 125 receives multimedia content 860. GW 823 is shown providing a bridge between access network 830 and LAN 824, and receiving multimedia content 860 from access network 830.

In embodiments suitable for use in IP based content delivery networks, MHD 825, as depicted in FIG. 8, may include transport unit 831 that assembles the payloads from a sequence or set of network packets into a stream of multimedia content. In coaxial based access networks, content may be delivered as a stream that is not packet based and it may not be necessary in these embodiments to include transport unit 830. In a co-axial implementation, however, clients, such as CPE 822, may utilize tuning resources (not explicitly depicted in FIG. 8) to "filter" desired content from other content that is delivered over the coaxial medium simultaneously and these tuners may be provided in MHDs 825. The stream of multimedia content received by transport unit 830 may include audio information and video information and transport unit 830 may parse or segregate the two to generate video stream 832 and audio stream 834 as shown.

Video and audio streams 832 and 834, as output from transport unit 830, may include audio or video information that is compressed, encrypted, or both. A decoder unit 840 is shown as receiving video and audio streams 832 and 834 and generating native format video and audio streams 842 and 844. Decoder 840 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 840 may employ any of various audio decoding algorithms including Dolby® Digital, Digital Theatre System (DTS) Coherent Acoustics, and Windows Media Audio (WMA).

The native format video and audio streams 842 and 844 as shown in FIG. 8 may be processed by encoders/digital-to-analog converters (encoders/DACs) 850 and 870 respectively to produce analog video and audio signals 852 and 854 in a format compliant with display 826, which itself may not be a part of MHD 825. Display 826 may comply with National Television System Committee (NTSC), Phase Alternating Line (PAL) or any other suitable television standard.

Storage 810 encompasses persistent and volatile media, fixed and removable media, and magnetic and semiconductor media. Storage 810 is operable to store instructions, data, or both. Storage 810 as shown may include sets or sequences of instructions, namely, an operating system 812, a remote control (RC) application program identified as RC module 814, an electronic programming guide (EPG) 816, and USF 818. Operating system 812 may be a UNIX or UNIX-like operating system, a Windows® family operating system, or another suitable operating system.

EPG 816 represents a guide to the multimedia content provided to CPE 822 via MCDN system 200 (see FIG. 2), and may be shown to the user as an element of the user interface. The user interface may include a plurality of menu items arranged according to one or more menu layouts, which enable a user to operate MHD 825. The user may operate the user interface, including EPG 816, using remote control (not shown in FIG. 2) in conjunction with RC module 814.

Figure 9:
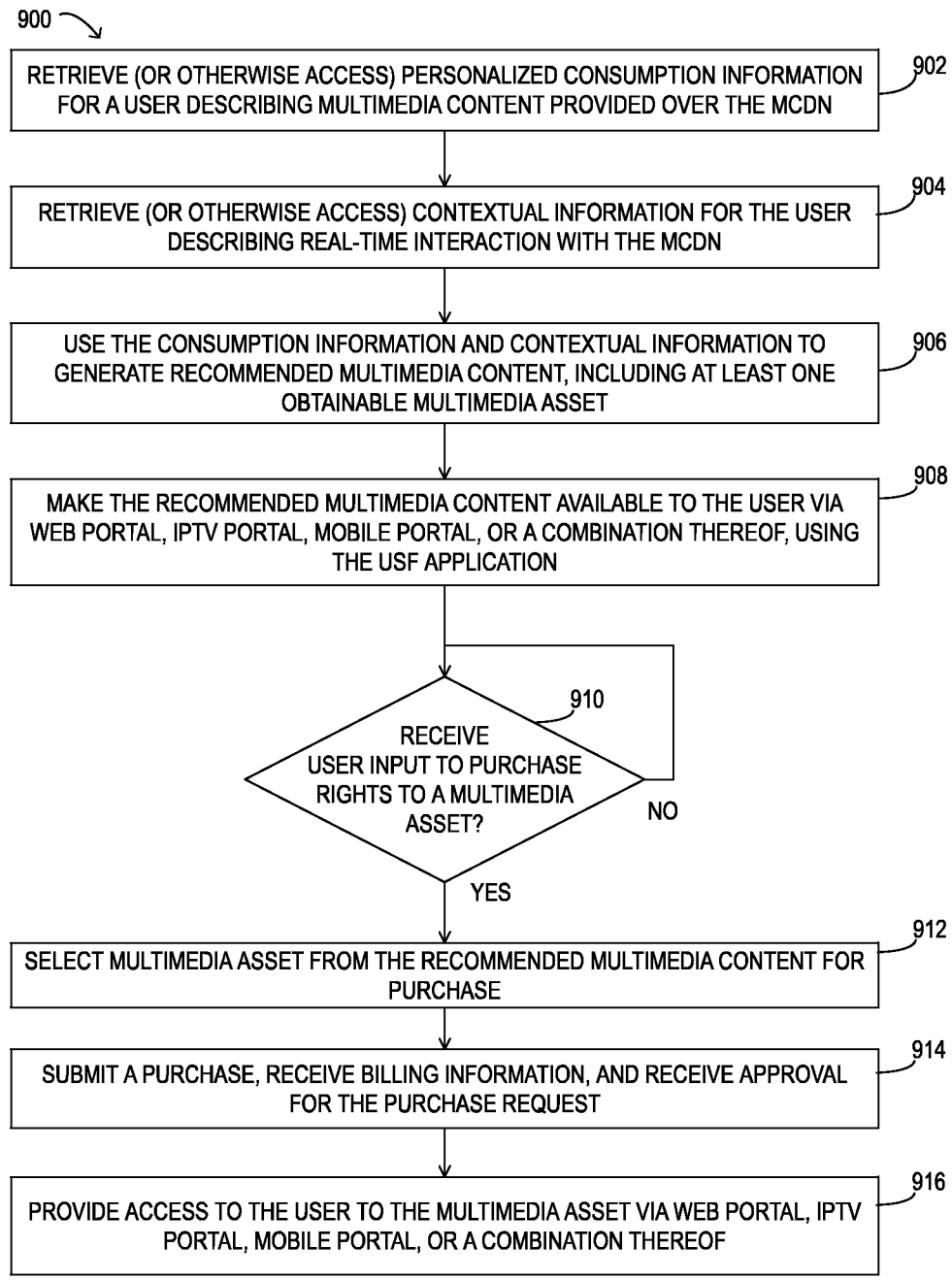
FIG. 9 illustrates an embodiment of a method for recommending multimedia content.

Turning now to FIG. 9, an embodiment of method 900 for recommending multimedia content is shown in flowchart form. In some examples, method 900 may be performed by a recommendation engine, such as recommendation engine 642 (see FIG. 6). In certain embodiments, operations depicted in method 900 may be rearranged or omitted, or may be optional.

Personalized consumption information for a user describing multimedia content provided over the MCDN may be retrieved or otherwise accessed (operation 902). The consumption information may be retrieved from a data warehousing system which aggregates consumption information for a plurality of users. The consumption information may be collected over a predetermined time period. Contextual information for the user describing real-time interaction with the MCDN may be retrieved or otherwise accessed (operation 904). The contextual information may be collected by CPE associated with the user. The contextual information may be relevant to immediate interactions by the user.

The consumption information and the contextual information may be used to generate recommended multimedia content, including at least one obtainable asset (operation 906). The recommended multimedia content may be based on personalized information generated using the consumption information and the contextual information. The personalized information may be matched to available assets that are obtainable by the user to generate the recommended multimedia content.

The recommended multimedia content may be made available to the user via web portal, IPTV portal, mobile portal, or a combination thereof, using the USF application (operation 908). A decision may then be made if user input to purchase rights in a multimedia asset has been received (operation 910). If the result of the decision is NO, then method 900 loops back to operation 910. If the result of the decision is YES, then a multimedia asset from the recommended multimedia content may be selected for a purchase request (operation 912). The purchase request may be submitted, billing information may be received, and approval for the purchase request may be received (operation 914). The purchase transaction may be performed by the user using the USF application. The user may be provided access to the multimedia asset via web portal, IPTV portal, mobile portal, or a combination thereof (operation 916). In some cases, the user is provided access to the multimedia asset from the USF application.

Figure 10:
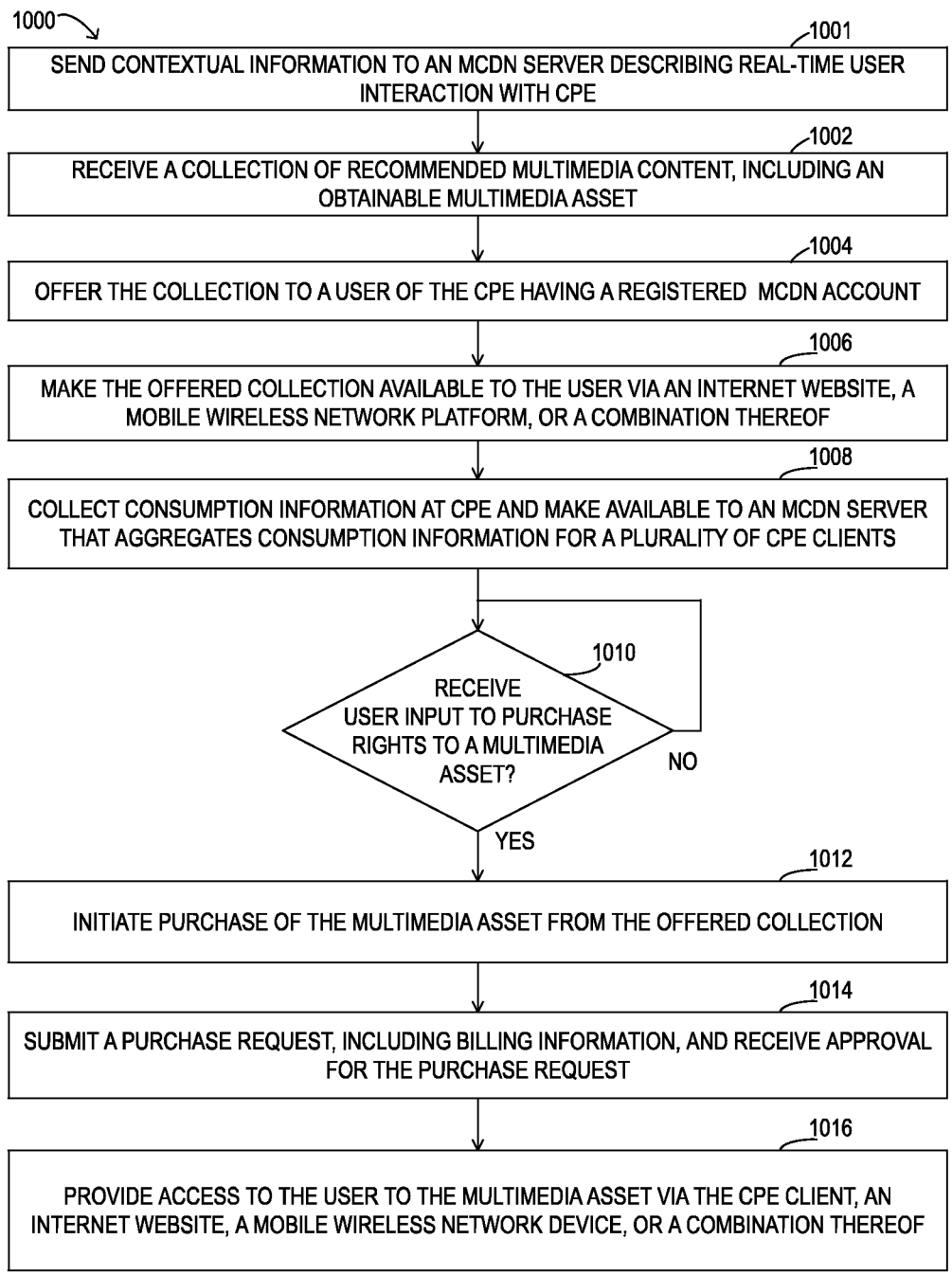
FIG. 10 illustrates an embodiment of a method for recommending multimedia content.

Turning now to FIG. 10, an embodiment of method 1000 for recommending multimedia content is shown in flowchart form. In some examples, method 1000 may be performed by a CPE, such as CPE 822 (see FIG. 8). In certain embodiments, operations depicted in method 1000 may be rearranged or omitted, or may be optional.

Contextual information describing real-time user interaction with CPE may be sent to an MCDN server (operation 1001). The contextual information may describe user interaction with an STB device for receiving multimedia programs, such as IPTV programs. The contextual information may also describe user interaction with a web browser and include results of deep packet inspection of web requests processed using CPE. A collection of recommended multimedia content, including an obtainable asset, may be received (operation 1002). The collection may be based on personalized preferences generated using the consumption information. The collection may also be based on rankings for multimedia assets by the plurality of users, such as most purchased, most viewed, and highest rated. The collection may be offered to a user of the CPE having a registered MCDN account (operation 1004). The offered collection may be made available to the user via an Internet website, a mobile wireless network platform, or a combination thereof (operation 1006). Consumption information may be collected at the CPE and made available to an MCDN server that aggregates consumption information for a plurality of clients (operation 1008).

A decision may then be made if user input to purchase rights in a multimedia asset has been received (operation 1010). If the result of the decision is NO, then method 1000 loops back to operation 1010. If the result of the decision is YES, then the purchase of a multimedia asset from the offered collection may be initiated (operation 1012). A purchase request may be submitted, including billing information, and approval for the purchase request may be received (operation 1014). The user may be provided access to the multimedia asset from the CPE client, an Internet website, a mobile wireless network device, or a combination thereof (operation 1016).

To the maximum extent allowed by law, the scope of the present disclosure is to be determined by the broadest permissible interpretation of the following claims and their equivalents, and shall not be restricted or limited to the specific embodiments described in the foregoing detailed description.

The invention claimed is:

1. A method, comprising:
   receiving, by a server, a request for electronic media content associated with a client device;
   sending, by the server, an electronic storefront to the client device requesting the electronic media content;
   sending, by the server, purchasable electronic assets to the client device, the purchasable electronic assets associated with the electronic media content, the purchasable electronic assets for inclusion in the electronic storefront;
   receiving, by the server, an electronic request associated with the client device, the electronic request requesting a purchase of an electronic asset of the purchasable electronic assets;
   determining, by the server, an asset type of the electronic asset requested for the purchase, the asset type selected from different asset types according to Internet protocol television assets, Internet assets, and mobile assets; and
   selecting, by the server, an access point to a network, the server having different network interfaces for the different asset types, and the selecting of the access point based on the asset type of the electronic asset.

2. The method of claim 1, further comprising retrieving a profile associated with the client device.

3. The method of claim 1, further comprising retrieving the electronic media content requested by the client device.

4. The method of claim 3, further comprising sending the electronic media content to the client device.

5. The method of claim 1, further comprising sending the electronic asset to the client device, the client device associated with an Internet protocol address.

6. The method of claim 1, further comprising retrieving the purchasable electronic assets associated with the media content.

7. The method of claim 1, further comprising retrieving the electronic storefront.

8. A system, comprising:
   a processor;
   a memory device, the memory device storing instructions, the instructions when executed causing the processor to perform operations, the operations comprising:
      receiving a request associated with a client device requesting electronic media content;
      sending an electronic storefront to the client device requesting the electronic media content;
      sending information describing purchasable electronic assets to the client device, the purchasable electronic assets associated with the electronic media content for inclusion in the electronic storefront;
      receiving an electronic purchase request associated with the client device, the electronic purchase request requesting a purchase of an electronic asset of the purchasable electronic assets;
      determining an asset type of the electronic asset requested for the purchase, the asset type selected from different asset types according to Internet protocol television assets, Internet assets, and mobile assets; and
      selecting a single access point of different network interfaces based on the asset type of the electronic asset selected for the purchase.

9. The system of claim 8, wherein the operations further comprise retrieving a profile associated with an Internet protocol address, the Internet protocol address associated with the client device.

10. The system of claim 8, wherein the operations further comprise retrieving the electronic media content requested by the client device.

11. The system of claim 10, wherein the operations further comprise sending the electronic media content to the client device.

12. The system of claim 8, wherein the operations further comprise sending the electronic asset to the client device.

13. The system of claim 8, wherein the operations further comprise retrieving the purchasable electronic assets associated with the media content.

14. The system of claim 8, wherein the operations further comprise retrieving the electronic storefront.

15. A memory device storing processor-executable instructions that when executed cause a processor to perform operations, the operations comprising:
   receiving an Internet protocol address associated with a client device requesting electronic media content;
   sending an electronic storefront to the client device associated with the Internet protocol address;
   sending information describing purchasable electronic assets to the client device associated with the Internet protocol address, the purchasable electronic assets associated with the media content for inclusion in the electronic storefront;
   receiving an electronic request associated with the client device associated with the Internet protocol address, the electronic request requesting a purchase of an electronic asset of the purchasable electronic assets included in the electronic storefront;
   determining an asset type of the electronic asset requested for the purchase, the asset type selected from different asset types according to one of Internet protocol television assets, Internet assets, and mobile assets; and
   selecting a single access point of different network interfaces, the selecting of the single access point based on the determining of the asset type of the electronic asset selected for the purchase.

16. The memory device of claim 15, wherein the operations further comprise retrieving a profile associated with the Internet protocol address.

17. The memory device of claim 15, wherein the operations further comprise retrieving the electronic media content requested by the client device.

18. The memory device of claim 17, wherein the operations further comprise sending the electronic media content to the Internet protocol address associated with the client device.

19. The memory device of claim 15, wherein the operations further comprise sending the electronic asset to the client device.

20. The memory device of claim 15, wherein the operations further comprise retrieving the purchasable electronic assets associated with the media content.

* * * * *